United States Patent [19]

Horiguchi

[11] Patent Number: 5,204,514
[45] Date of Patent: Apr. 20, 1993

[54] INFORMATION RECORDING/REPRODUCING METHOD CAPABLE OF FAST-ACCESSING

[75] Inventor: Toshio Horiguchi, Hachioji, Japan

[73] Assignee: Olympus Optical Co., Ltd., Tokyo, Japan

[21] Appl. No.: 660,713

[22] Filed: Feb. 22, 1991

[51] Int. Cl.⁵ .............................................. G06K 7/10
[52] U.S. Cl. ................................... 235/454; 235/476; 369/32
[58] Field of Search ............... 235/454, 476, 487, 494; 369/32

[56] References Cited

U.S. PATENT DOCUMENTS

| 4,797,872 | 1/1989 | Rokutan | 235/454 |
| 4,885,458 | 12/1989 | Horiguchi et al. | 235/454 |

FOREIGN PATENT DOCUMENTS

| 63-37876 | 2/1988 | Japan . | |
| 63-204568 | 8/1988 | Japan . | |
| 0236473 | 9/1989 | Japan | 369/32 |

Primary Examiner—John W. Shepperd
Attorney, Agent, or Firm—Frishauf, Holtz, Goodman & Woodward

[57] ABSTRACT

A method of performing high-speed positioning of a light beam onto a desired track of a recording medium, such as an optical card, which has an ID portion formed on only one end portion of each of a plurality of parallel tracks. As seen in FIG. 1B, the ID portion 14 is formed by sequentially arranging an ID mark 21 representing the start of the ID portion 14 in a forward read operation, a PLL pull-in region 22 as a data separator in a forward read operation, a sync signal 23 representing the start of track information in a forward read operation, track (address) information 24, a sync signal 25 representing the start of track information in a reverse read operation, a PLL pull-in region 26 as a data separator in a reverse read operation, and an ID mark 27 representing the start of the ID portion 14 in a reverse read operation. The data information recorded on the data portion 15 is to be read either in the forward direction or in the reverse direction. When the light beam is located on the other end portion of each track, the light beam is relatively moved in a direction to cross the tracks. Subsequently, the ID portion is read while the light beam is moved along the tracks toward one end portion, thereby accessing the desired track.

5 Claims, 5 Drawing Sheets

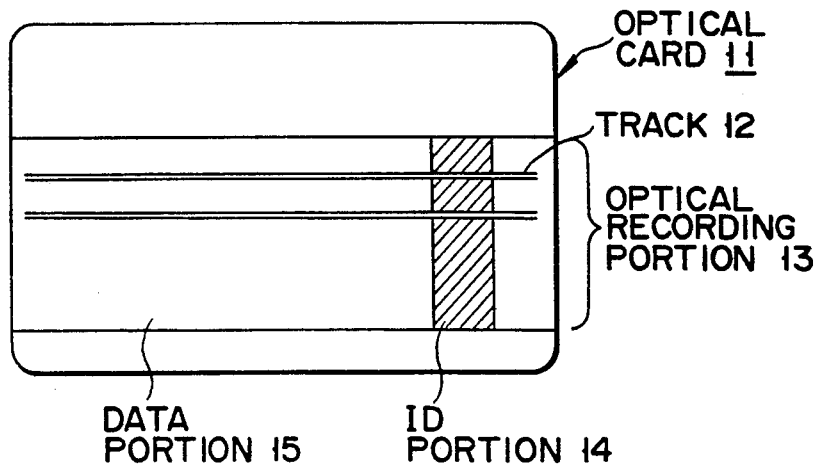
F I G. 1A
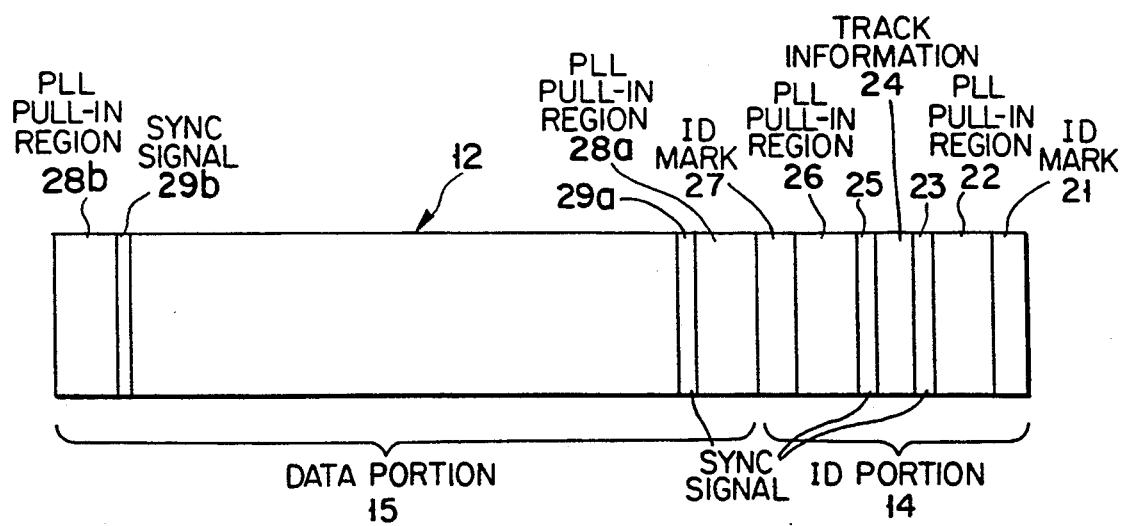
F I G. 1B

INFORMATION RECORDING/REPRODUCING METHOD CAPABLE OF FAST-ACCESSING

BACKGROUND OF THE INVENTION

1. Field of the Invention

The present invention generally relates to an information recording/reproducing method and, more particularly, to an information recording/reproducing method capable of accessing a desired track on a recording medium such as an optical card at high speed.

2. Description of the Related Art

Recently, information recording/reproducing systems using various types of recording media have been developed. They have been used in a variety of fields.

In such information recording/reproducing systems, optical cards start to attract a great deal of attention. This is because an optical card has a storage capacity several thousands to ten thousands times larger than that of a magnetic card. Similar to an optical disk, such an optical card is not generally rewritable. An optical card, however, has a large storage capacity of 1 to 2 Mbytes. For this reason, a wide variety of applications of optical cards, e.g., banknotes, portable road maps, and pre-paid cards used for shopping, have been proposed.

Such conventional optical cards are disclosed in, e.g., Published Unexamined Japanese Patent Application No. 63-37876. In one type of optical card, an ID portion on which the address information of each track is recorded is formed on only one end portion of a corresponding one of a plurality of parallel tracks (to be referred to as a single-side ID optical card hereinafter). In another type of optical card, ID portions are formed on the two ends of each of tracks (to be referred to as a double-side ID optical card hereinafter).

In an optical card of this type, recording/reproducing of data and reading of ID portions, sector marks, and the like are performed by relatively moving the optical card in an optical beam from a recording/reproducing optical head in a direction parallel to the tracks on the optical card. A target track is accessed by performing a combination of coarse-accessing and track-jumping operations in accordance with commands from a controller. In a coarse-accessing operation, coarse positioning is performed by moving the overall optical head having an objective lens by means of a linear moving mechanism in a direction perpendicular to each track on the optical card, and simultaneously detecting the position of the moving optical head by means of a position detecting section. In a track-jumping operation, the object lens is moved every track pitch by means of a tracking drive means.

In a conventional system, therefore, when a single-side ID optical card 1 shown in FIG. 6 is used, a target track is accessed in accordance with a flow chart shown in FIG. 7. Note that in the optical card 1 shown in FIG. 6, ID portions 4 on which the address information of the respective track are recorded are formed, in correspondence with the tracks, on only one end portion of an optical recording portion 3 having a plurality of parallel tracks 2, and a data portion 5 is formed between the ID portion 4 and the other end portion of the optical recording portion 3. The ID portion 4 can be properly read by reading the optical card 1 from a right end portion to the left.

A conventional accessing method with respect to the single-side ID optical card 1 will be described below with reference to a view showing the locus of a light beam directed onto the optical card in FIGS. 6 and a flow chart in FIG. 7.

Referring to FIG. 6, assume that the optical card 1 is stopped, a recording/reproducing light beam is directed to an end position S1 on a side opposite to the ID portion 4, and the address of a corresponding track has already been read. A controller moves the optical card 1 in a direction parallel to the track to direct the light beam to an end position S2 on the opposite side to the end position S1 (step S11). The controller calculates a difference D between the address of a target track and that of the current track (step S12), and checks whether an absolute value $|D|$ of the difference D is smaller than a predetermined value (step S13). If $|D|<a$, the target track can be accessed in a shorter period of time by repeating a track-jumping operation than by performing a coarse-accessing operation of moving the overall optical head. In this case, therefore, the controller does not perform a coarse-accessing operation but performs a track-jumping operation by an amount corresponding to the track difference D (step S14). Note that the predetermined value a is normally set to be about 4 to 10. If $|D|>a$, the controller moves the overall optical head by a distance corresponding to the track difference D to perform a coarse-accessing operation (step S15). Reference symbol S3 in FIG. 6 denotes the directed position of the light beam after the movement described above.

Subsequently, the controller moves the optical card 1 in the track direction (step S16), and simultaneously reads the address, of the corresponding track, recorded on the ID portion 4 to detect the address of the track after the movement (step S17). At the same time, the controller checks whether the detected address corresponds to the target track (step S18). In this case, if the access is made by a track-jumping operation, the detected address coincides with that of the target track in most cases. However, if the access is made by coarse-accessing operation, the detected address does not often coincide with that of the target track. If they do not coincide with each other, the controller immediately stops the movement of the optical card 1 (step S19), and directs the light beam to a position S4. Thereafter, the controller calculates the difference D between the address of the current track and that of the target track in the same manner as described above (step S20) to perform access control again. In this case, since the position S4 to which the light beam is directed is located relatively near the target track regardless of whether the first accessing operation is performed by track jumping or coarse accessing, $|D|>a$. For this reason, the controller performs track-jumping operation by an amount corresponding to the difference D (step S21), thus directing the light beam to a position S5. Subsequently, the controller moves the optical card 1 in the opposite direction to direct the light beam to an end position S6 on the side of the ID portion 4 of the optical card 1 (step S22). Lastly, the controller drives the optical card 1 from the position S6 (step S23), and reads the address of the corresponding track in the ID portion 4 again (step S17). If the read address coincides with the address of the target track (step S18), the controller performs a read or write operation with respect to the data portion 5.

In contrast to this, when a double-side ID optical card is used, ID portions are arranged on the two end portions of each track. Therefore, the controller immediately performs a coarse-accessing operation or a track-jumping operation to start accessing to a target track, while omitting step S11 in the above-described accessing operation of the single-side ID optical card, regardless of whether the light beam is directed to one end or the other end.

As is apparent from the above description, in the conventional access method for a single-side ID optical card, if a light beam is located at an end portion on the opposite side of the ID portion, the optical card is moved to position the light beam to an end portion near the ID portion in the first place. Since such movement requires an extra time, the access time is inevitably prolonged.

An information recording/reproducing system using such a single-side ID recording medium (optical card), therefore, cannot access to a desired track at high speed. This interferes with a high-speed read/write operation.

SUMMARY OF THE INVENTION

It is, therefore, an object of the present invention to provide a new and improved information recording/reproducing method which allows access to a desired track on a single-side ID recording medium at high speed, thereby realizing high-speed read/write operation.

According to one aspect of the present invention, there is provided a method for accessing a desired track of a plurality of recording/reproducing tracks, which are formed on a recording medium to be parallel to each other, so as to record/reproduce information of the track, while reading address information recorded on an ID portion formed on only an end portion of one side of each of the tracks by relatively moving a recording/reproducing head with respect to the recording medium, the ID portion having address information of each track recorded thereon, the method comprising:

preparing address information on the ID portion of the recording medium, which can perform read access regardless of whether the head is relatively moved in a forward or reverse direction;

determining a position at which the head is located on an end portion on a side opposite to an end portion on a side where the ID portion on the recording medium is formed;

calculating a track difference between the desired track to be accessed and a current track;

relatively moving the head with respect to the recording medium in accordance with the track difference in a direction in which the position to which the head is directed crosses the tracks on the recording medium;

relatively moving the head with respect to the recording medium, after the position to which the head is directed is shifted in a direction to cross the tracks on the recording medium, in a direction in which the position to which the head is directed is shifted along a forming direction of the tracks toward the end portion on the side where the ID portion on the recording medium is formed;

reading the address information, of a corresponding track, recorded on the ID portion in the reverse direction by using the head in the process of shifting the position to which the head is directed along the forming direction of the tracks toward the end portion on the side where the ID portion on the recording medium is formed;

demodulating the address information read in the reverse direction by a reverse procedure to that required when a read operation is performed in the forward direction, thereby performing reconstruction of the information; and determining whether a track, to which the head is moved in accordance with the reconstructed address information, coincides with the desired track, and that the desired track is accessed if it is determined that the addresses coincide with each other.

According to another aspect of the present invention, there is provided an optical card access method comprising the steps of positioning a light beam onto a desired track of an optical card having an ID portion formed on only one end portion of each of a plurality of parallel tracks, the ID portion having address information of each track recorded therein, and relatively moving the light beam in a direction to cross the tracks, when the light beam is located on the other end portion of each track, subsequently reading the ID portion and relatively moving the light beam along the tracks toward one end portion, thereby accessing the desired track.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1A is a view showing an arrangement of an optical card as an example of a recording medium used in the present invention;

FIG. 1B is a view showing a track format of the optical card in FIG. 1A;

FIGS. 3, 4, and 5 are views for explaining an operation of the present invention, in which FIG. 3 is a flow chart showing an accessing operation with respect a desired track, and FIGS. 4 and 5 are views showing the accessing operation with respect to the desired track as the loci of light beams; and FIGS. 6 and 7 are views for explaining a prior art, in which FIG. 6 is a view showing an accessing operation with respect to a desired track on a conventional optical card as the locus of a light beam, and FIG. 7 is a flow chart for explaining the accessing operation with respect to the desired track on the conventional optical card.

DETAILED DESCRIPTION OF THE PREFERRED EMBODIMENTS

Figure 2:
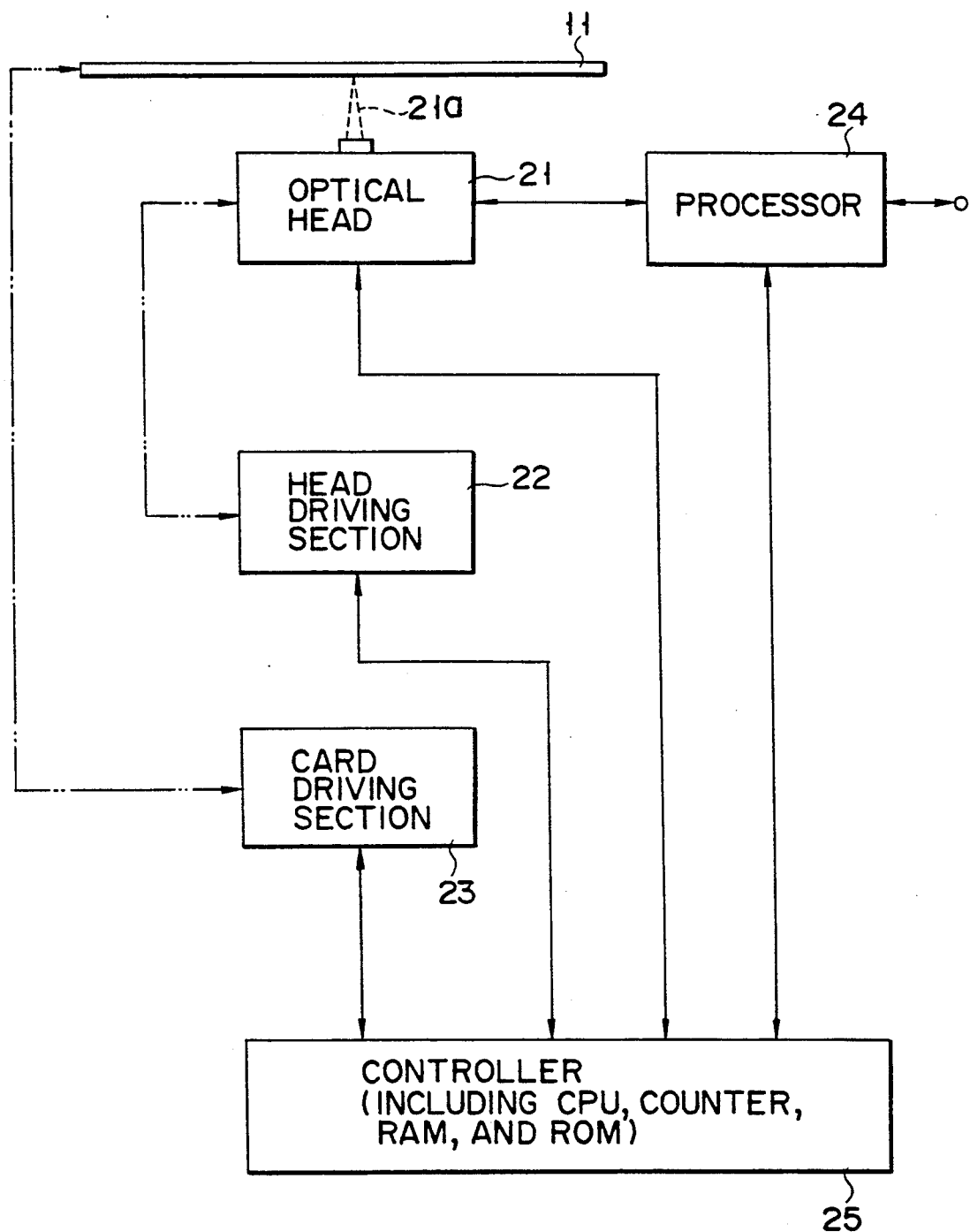
FIG. 2 is a block diagram showing a schematic arrangement of a system for executing a method according to the present invention.

Reference will now be made in detail to the presently preferred embodiments of the invention as illustrated in the accompanying drawings, in which like reference characters designate the like or corresponding parts throughout the several drawings.

An embodiment of the present invention, which is applied to an information recording/reproducing system using an optical card as a recording medium, will be described below with reference to the accompanying drawings.

FIG. 1A shows an arrangement of an optical card used for the present invention. An optical card 11 has an ID portion 14 formed on only one end portion of an optical recording portion 13 having a plurality of tracks 12. The tracks 12 extend in the longitudinal direction of the card 11 so as to be parallel to each other in the widthwise direction thereof. In the ID portion 14, pieces of track information are recorded in correspondence with the respective tracks. In addition, the optical card 11 has a data portion 15 formed between the ID portion 14 and the other end portion of the optical recording portion 13. When a light beam from a recording/reproducing optical head (to be described later) is moved relative to the optical card 11 from the right to the left (to be referred to as a forward direction hereinafter) of a track 12 and from the left to the right (to be referred to as a reverse direction hereinafter), track (address) information is read from the ID portion 14 from both the directions.

More specifically, as indicated by an example of a track format in FIG. 1B, the ID portion 14 is formed by sequentially arranging an ID mark 21 representing the start of the ID portion 14 in a forward read operation, a phase-locked loop (PLL) pull-in region 22 as a data separator in a forward read operation, a sync signal 23 representing the start of track information in a forward read operation, track (address) information 24, a sync signal 25 representing the start of track information in a reverse read operation, a PLL pull-in region 26 as a data separator in a reverse read operation, and an ID mark 27 representing the start of the ID portion 14 in a reverse read operation.

In the track (address) information 24, serial data of track addresses modulated by a modified frequency modulation (MFM) scheme are recorded from the right to the left. In a read operation, two track information demodulators arranged in a processor (to be described later) are selectively used in accordance with a read direction, i.e., the forward or reverse direction. With this operation, when an optical card is moved in the forward direction, demodulation is performed by a normal procedure to reproduce a track address, whereas when it is moved in the reverse direction, demodulation is performed in the reverse procedure to the normal demodulation to reproduce a track address.

The sync signals 23 and 25, each representing the start of the track information 24, are formed by recording fixed patterns of bit strings, which do not appear in a modulation rule, from the right to the left. For this reason, similar to a read operation of track information, a read operation of the sync signals 23 and 25 is performed by selectively using two sync signal demodulators in the processor in accordance with a read direction. With this operation, the respective fixed patterns are detected by switching their directions depending on read directions.

The data information recorded on the data portion 15 is to be read either in the forward direction or in the reverse direction. This data information read operation is performed by an data read section in the processor in accordance with PLL pull-in regions 28a and 28b as data separators and sync signals 29a and 29b representing the start of the data. These regions 28a and 28b and the signals 29a and 29b are arranged at the two ends in the data portion 15.

FIG. 2 shows a schematic arrangement of a system for performing a read/write operation by using the optical card 11 having the track format described above. An optical head 21 is designed to be freely moved by a head driving section 22 mainly in a direction to cross the tracks on the optical card 11 so as to direct a recording/reproducing light beam 21a onto the optical card 11. The optical card 11 is freely moved by a card driving section 23 mainly in a direction parael to the tracks on the optical card 11. Write data or read data to or from the optical head 21 is subjected to the various processing described above in a processor 24. A controller 25 controls the overall system. The controller 25 supplies various types of control and command signals to the optical head 21, the head driving section 22, the card driving section 23, and the controller 25 in accordance with a predetermined program sequence, and exchanges data for required operations. The controller 25 is realized by a CPU including peripheral circuits such as a counter, a ROM, and a RAM.

Figure 3:
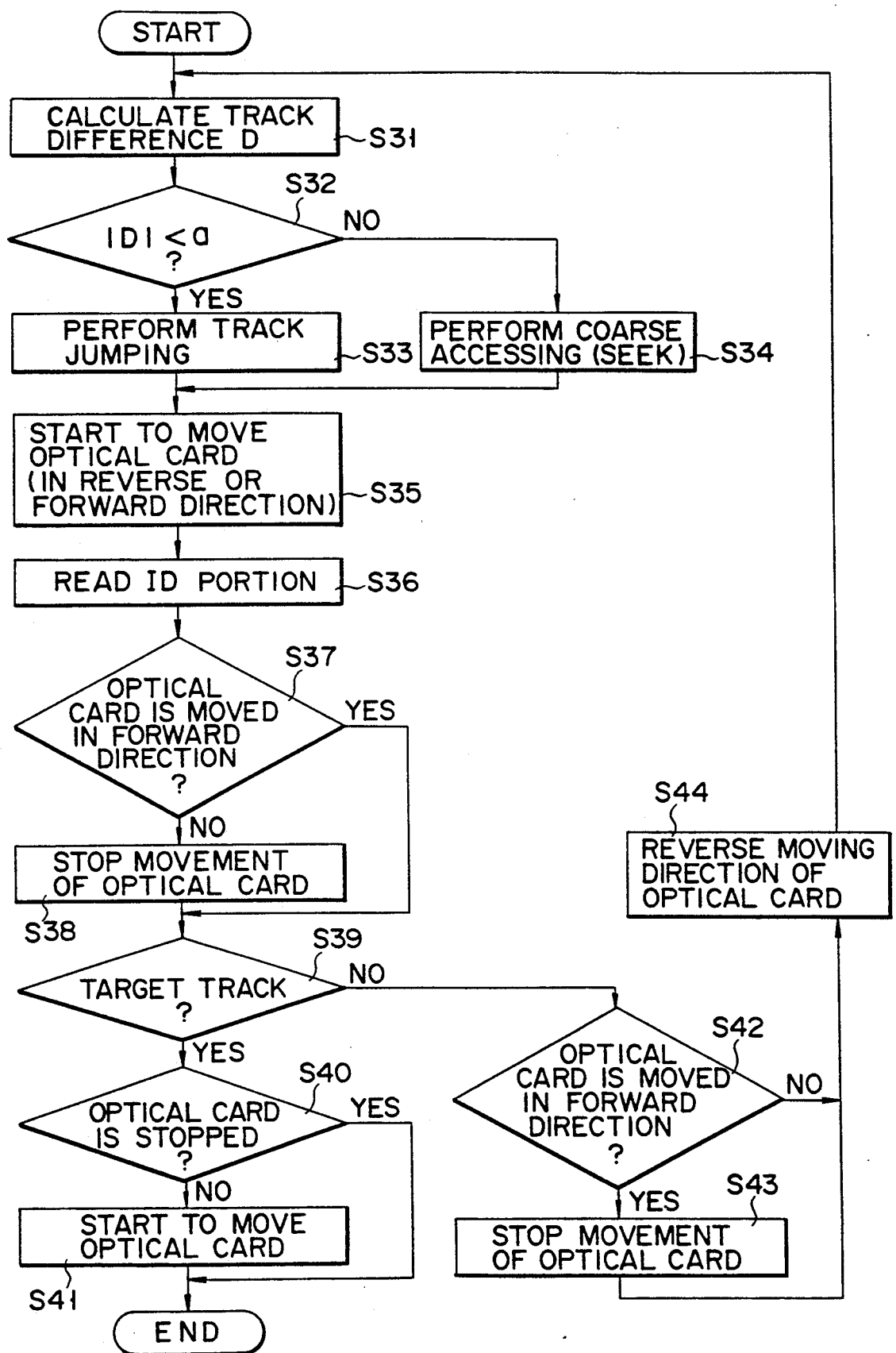

An accessing operation with respect to a desired track will be described below with reference to a flow chart in FIG. 3 and a view showing the locus of a light beam on the optical card 11 in FIG. 4. This operation is required to perform a read/write operation with respect to the optical card shown in FIG. 1A, which has the track format shown in FIG. 1B, by using the optical information recording/reproducing system in FIG. 2.

Figure 4:
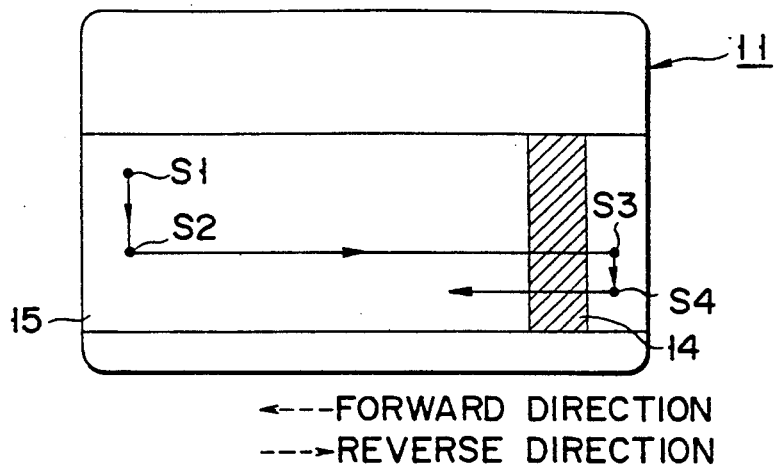

Referring to FIG. 4, assume that the optical card 11 is stopped, the recording/reproducing beam 21a is directed to a position S1 on an end portion of the optical card 11 which is opposite to the ID portion 14, and a corresponding track address has already been read by the controller 25. The controller 25 calculates a difference D between a target track address on the optical card 11 and the current track address (step S31), and checks whether an absolute value $|D|$ of the difference D is smaller than a predetermined value a (step S32). If it is determined in step S32 that $|D|<a$, the controller 25 supplies a command to the optical head 21 through the head driving section 22 so as to repeat a track-jumping operation by a distance corresponding to the track difference D (step S33). If it is determined that $|D|>a$, the controller 25 commands the head driving section 22 to perform a coarse-accessing (seek) operation so as to move the overall optical head 21 by a distance corresponding to the track difference D (step S34). Reference symbol S2 in FIG. 4 denotes a position to which the light beam is directed after this movement of the optical head 21.

Subsequently, the controller 25 causes the card driving section 23 to move the optical card 11 in the reverse direction (step S35), and simultaneously reads a track address, recorded on the ID portion 14, from the left to the right in FIG. 4 through the optical head 21 and the processor 24 (step S36). Thereafter, the controller 25 commands the card driving section 23 to stop the movement of the optical card 11 (steps S37 and S38), and also commands the head driving section 22 to direct the light beam 21a to a position S3 on an end portion where the ID portion 14 is formed. If the read track address coincides with the target address (step S39), the controller 25 immediately reverses the moving direction of the optical card 11 to read data from the track in the forward direction (steps S40 and S41).

In contrast to this, if the read address does not coincide with the target address (step S39), the controller 25 commands the card driving section 23 to reverse the moving direction of the optical card 11 (steps S42, S43, and S44). The flow then returns to step S31, the first step of the flow chart in FIG. 3 to calculate the difference D between the current track address and the target track address. In this case, the position S3 to which the light beam 21a is directed is located relatively near the target track regardless of whether the first accessing operation is performed by track jumping or coarse accessing. Since $|D|<a$ in step S32 as described above, the controller 25 performs track jumping by an amount corresponding to the track difference D (step S33), and directs the light beam 21a to a position S4. The controller 25 reads the ID portion 1 from the right to the left while moving the optical card 11 in the forward direction (steps S35 and S36), and checks a track address (steps S37 to S39). If the address coincides with the target track, the controller 25 performs a read or write operation of corresponding data (step S40 and S41). If the target track cannot be accessed after these two accessing (seek) operations, the controller 25 causes the flow to return to the first step of the flow chart, and commands the system to perform a retry operation by a predetermined number of times.

Figure 5:
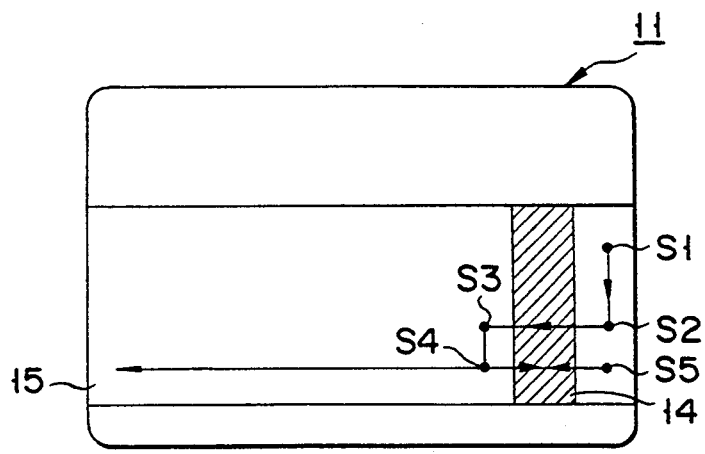

In the above description, it is assumed that the light beam is located on an end portion on the side opposite to the ID portion. As shown in FIG. 5, however, an accessing (seek) operation can be performed in accordance with the flow chart in FIG. 3 even if the light beam is initially located on the same side as that of the ID portion 14.

Figure 6:
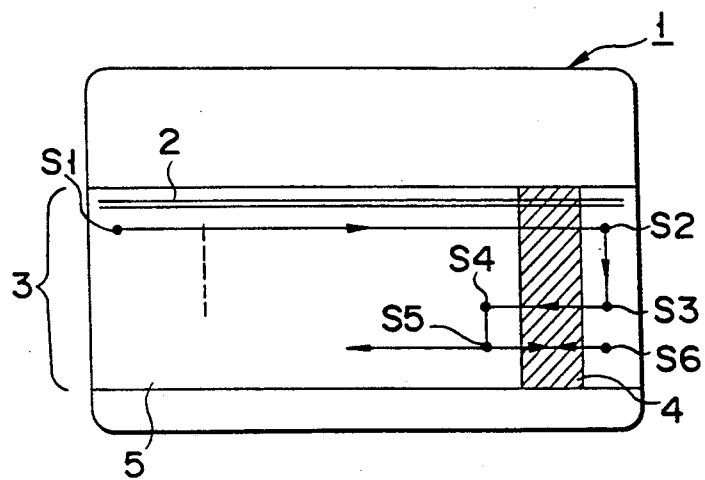
Figure 7:
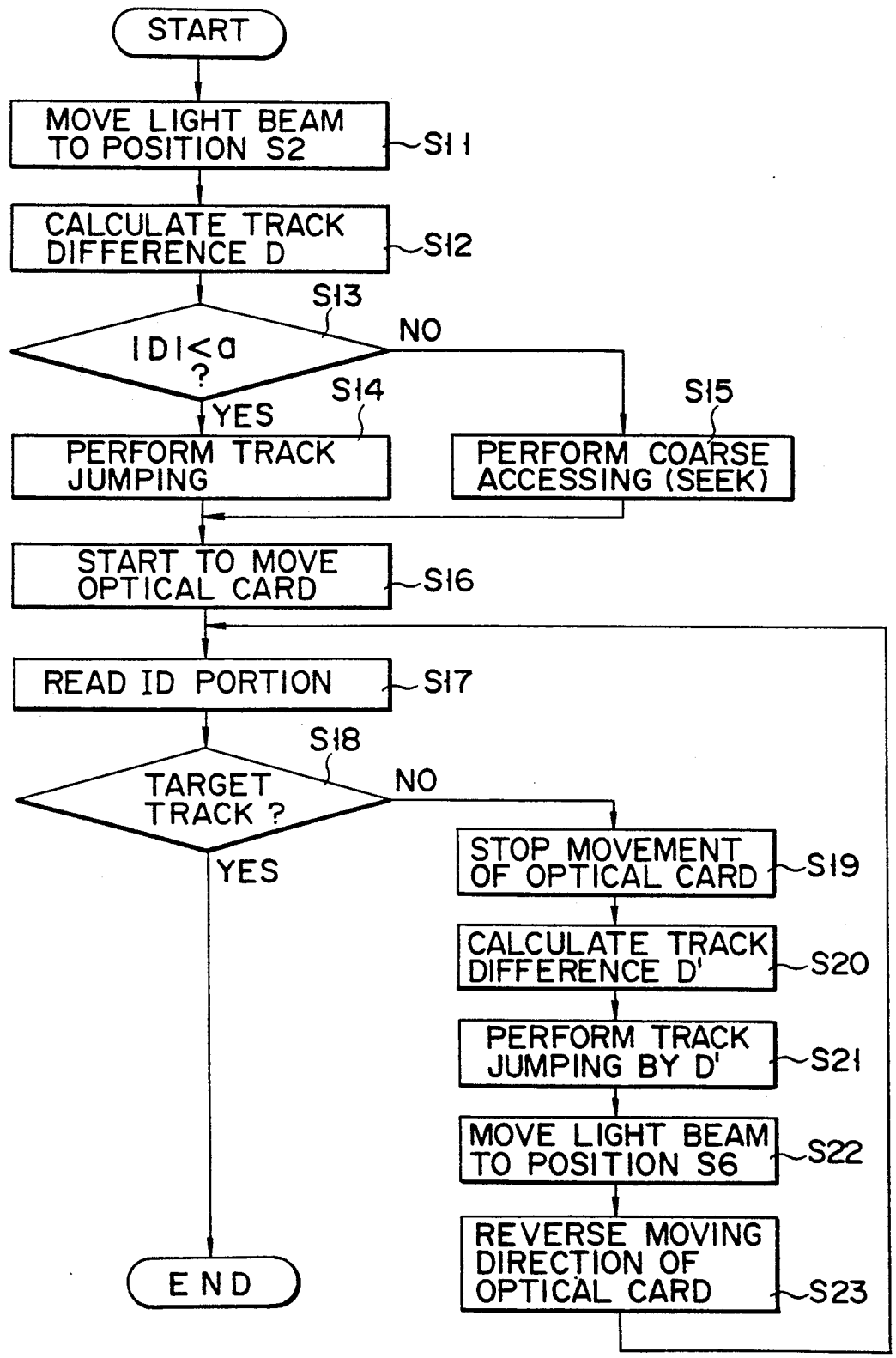

The difference between the access time required when a light beam is initially located on the opposite side to the ID portion 14 in this embodiment and that in the prior art corresponds to a time required for a light beam to reciprocate on the ID portion 4 once in FIG. 6. In practice, the time required to read the ID portion 4 is about 45 ms (milli-seconds), and the settling time required to reverse the movement of the optical card 1 is about 20 ms. According to this embodiment, therefore, the access time can be shorted by about 110 ms.

As has been described above, according to the present invention, when a desired track of a recording medium (optical card) having an ID portion recorded on only one side thereof is to be accessed, even if a recording/reproducing head (light beam) is directed to a position on the opposite side to the ID portion, an accessing operation is immediately started by performing coarse accessing or track jumping. Therefore, the time required to access the desired track on the recording medium (optical card) can be shortened.

Such an access method, therefore, can contribute to an increase in speed of a read/write operation with respect to a recording medium.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A method for accessing a desired track of a plurality of recording/reproducing tracks, which are formed on a recording medium to be parallel to each other, so as to record/reproduce information of the track, while reading address information recorded on an ID portion formed on only an end portion of one side of each of the tracks by relatively moving a recording/reproducing head with respect to the recording medium, the ID portion having address information of each track recorded thereon, said method comprising:

preparing address information on the ID portion of the recording medium, which can enable read access regardless of whether said head is relatively moved in a forward or reverse direction, said ID portion being formed by sequentially arranging a first ID mark representing the start of the ID portion in a forward read operation, a first phase-locked loop (PLL) pull-in region as a data separator in a forward read operation, a first sync signal representing the start of track information in a forward read operation, the address information, a second sync signal representing the start of track information in a reverse read operation, a second PLL pull-in region as a data separator in a reverse read operation, and a second ID mark representing the start of the ID portion in a reverse read operation;

determining a position at which said head is located on an end portion on a side opposite to an end portion on a side where the ID portion on the recording medium is formed;

calculating a track difference between the desired track to be accessed and a current track;

relatively moving said head with respect to the recording medium in accordance with the track difference in a direction in which the position to which said head is directed crosses the tracks on the recording medium;

relatively moving said head with respect to the recording medium, after the position to which said head is directed is shifted in a direction to cross the tracks on the recording medium, in a direction in which the position to which said head is directed is shifted along a forming direction of the tracks toward the end portion on the side where the ID portion on the recording medium is formed;

reading the second ID mark, the second PLL pull-in region, the second sync signal and the address information, of a corresponding track, recorded on the ID portion in the reverse direction to which said head in the process of shifting the position to which said head is directed along the forming direction of the tracks toward the end portion on the side where the ID portion on the recording medium is formed;

demodulating the address information in accordance with the second ID mark, the second PLL pull-in region and the second sync signal read in the reverse direction by a reverse procedure opposite to that required when a read operation is performed in the forward direction, thereby performing reconstruction of the address information; and determining whether the address of a track, to which said head is moved in accordance with the reconstructed address information, coincides with the address of the desired track, and accessing the desired track if it is determined that the addresses coincide with each other.

2. A method according to claim 1, wherein the recording medium includes an optical card.

3. A method according to claim 1, wherein address information modulated by an MFM modulation scheme is recorded on the ID portion.

4. A method according to claim 1, further comprising the steps of:

determining whether the track difference is smaller than a predetermined value;

performing coarse accessing to the desired track to move said head in a direction to cross the tracks if the track difference is larger than the predetermined value; and performing track jumping to the desired track in units of tracks so as to move said head in a direction to cross the tracks if the track difference is smaller than the predetermined value.

5. A method according to claim 1, further comprising the step of re-trying an accessing operation with respect to the desired track by a predetermined number of times if it is determined that the addresses do not coincide with each other.

* * * * *